July 12, 1955 D. C. WHITAKER 2,712,829
VALVE DEVICE FOR PRESSURE COOKERS AND THE LIKE
Filed Oct. 30, 1951 2 Sheets-Sheet 2

Inventor:
Douglas C. Whitaker
by his Attorneys
Howson & Howson

United States Patent Office 2,712,829
Patented July 12, 1955

2,712,829

VALVE DEVICE FOR PRESSURE COOKERS AND THE LIKE

Douglas C. Whitaker, Wyncote, Pa., assignor to Proctor Electric Company, Philadelphia, Pa., a corporation of Pennsylvania Application October 30, 1951, Serial No. 253,895

14 Claims. (Cl. 137—469)

This invention relates to improvements in actuating valves for pressure containers, and in particular relates to pressure operated actuating and relief valves such as are incorporated in automatic pressure cooking devices.

In the copending application of C. R. Turner and P. G. Turner, Serial No. 777,496, filed October 2, 1947, now Patent No. 2,641,680, issued June 9, 1953, a pressure operated valve is shown in combination with a pressure cooking vessel and a heating coil having controls therefor actuated by the pressure operated valve. The pressure operated valve has several functions which are described in that application and include movement of a piston member from one position to another as the pressure within the pressure cooking vessel rises initially to a predetermined value. Another function of the valve is to prevent pressure in the pressure cooking vessel from exceeding a second predetermined value, higher than the first predetermined value at which the piston member is moved. A third function of the valve is to provide for the venting of pressure from within the pressure cooking vessel, at a rate as rapid as possible commensurate with the quantity of heat in the contents of the cooking vessel. In the automatic cooker of that application, the controls provide a downward force on the valve piston to break its seal on the venting orifice and to permit steam to escape from the interior of the vessel.

It has been found, in automatic pressure venting devices, that certain foods froth and go through a period of violent ebullition, as the pressure in the cooking vessel is reduced. As is well known and understood, liquids under pressure have a higher boiling temperature than when at a reduced pressure, or at atmospheric pressure. When the pressure in the cooking vessel is suddenly and substantailly reduced, the total heat of its contents provides the required heat of evaporation to cause boiling of those contents. By experiment, the maximum rate of pressure venting has been determined, and that rate has been taken as the rate at which the frothing or increased ebullition will not cause the level of the contents to rise to the top of the vessel so as to clog the venting outlet. The period of time during which the pressure in the vessel is venting is a portion of the total cooking time which also includes the time under cooking pressure and the time taken to raise the temperature to that corresponding to the cooking pressure. It has been found that the maximum rate of venting is not fast enough in certain cases, as it adds too much time to the effective cooking period. For instance, certain foods having short cooking periods will overcook if normal maximum venting is used.

In the case of automatic operation of a pressure cooker, as in the apparatus of the aforementioned application, it is desirable to provide for rapid automatic venting so that there will be no appreciable cooking during the venting operation. Furthermore, rapid venting is desirable from the standpoint of time economy. At the same time, it is not practical to effect a sudden and complete reduction of pressure from the relatively high cooking pressure, as this would cause violent ebullition of the food contents as above mentioned.

The primary object of the present invention is to provide for rapid venting of a pressure cooker without producing undesirable ebullition of the cooker contents. This object is achieved by providing a valve device which, during the venting operation, first provides a relatively small venting orifice to effect first a relatively high resistance to venting, and subsequently, in response to decrease of pressure within the cooker, provides a larger orifice to effect a "dumping" action, i. e. very rapid venting of the pressure within the cooker.

A still further object is to provide means, in an automatic pressure cooker vent valve, for insuring initial actuating motion without escape of steam, and for venting the last increments of steam pressure from the vessel at a rate greater than the rate at which the full cooking pressure is initially vented.

Another object is to provide a combined pressure operated actuating and relief valve having provision for venting, which is adapted to mass production by standard machinery and which shall have no parts requiring unusual machining operations, and further, which shall be easily assembled into an operable device without the need for special fixtures or operations.

With these objects in mind, a clear understanding of the invention may be had from the following description and the accompanying drawings, in which:

Fig. 6 illustrates the device in cooperative association with control apparatus of the character shown in the above-mentioned application.

Figure 1:
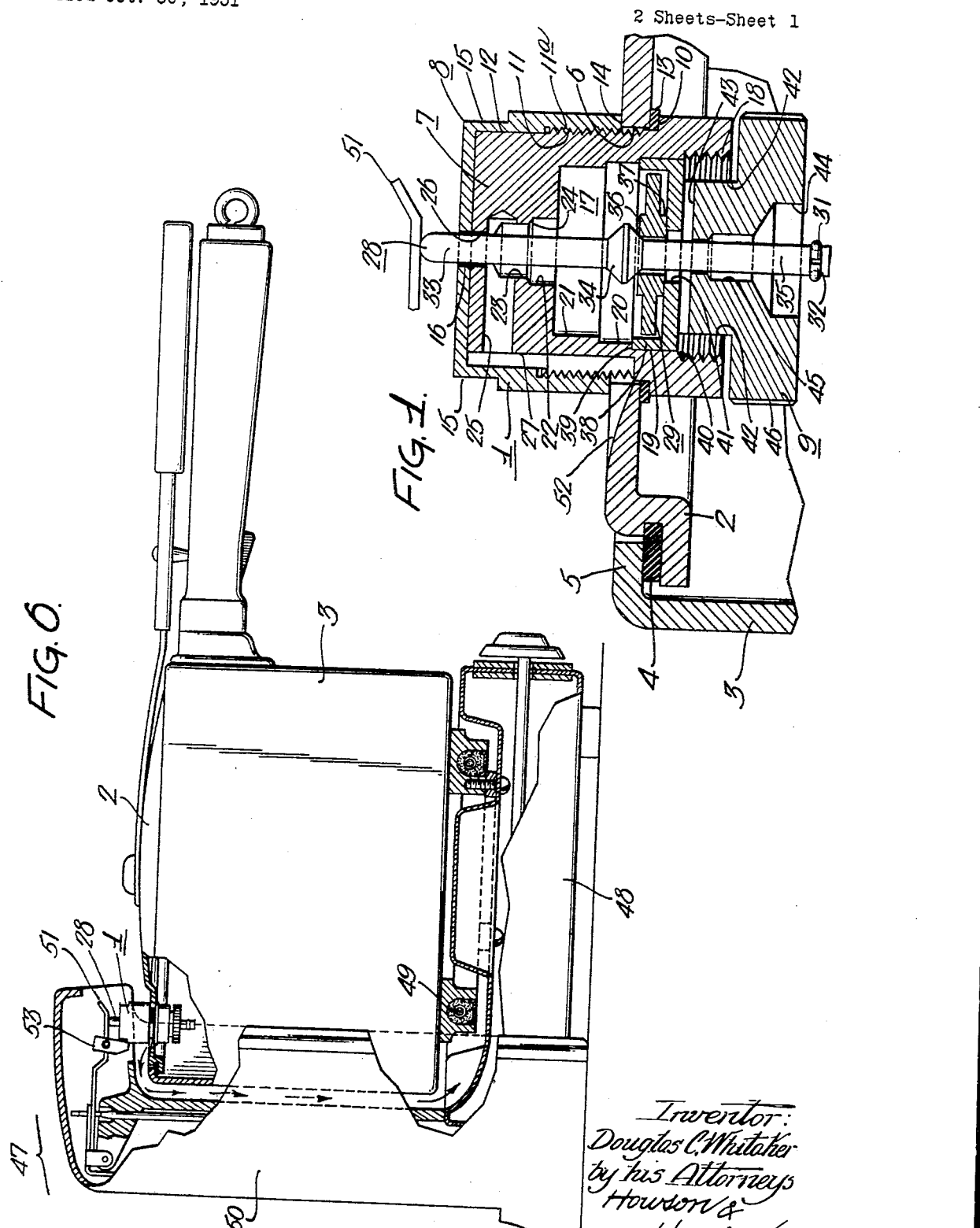
Fig. 1 is a sectional view of the device in the lid of a pressure cooking vessel, showing the movable parts in the positions which they assume when no pressure exists in the pressure cooking vessel.

Referring particularly to Figs. 1 to 5, a pressure operated actuating valve 1 is fitted in the lid 2 of a pressure cooking vessel 3. This pressure cooking vessel may be of the type disclosed in U. S. Patent No. 2,570,993 issued October 9, 1951, to C. R. Turner. A gasket 4, of rubber or other suitable compressible material, is fitted to the lid of the vessel so as to engage the underside of the lip 5 of the vessel and to provide a seal whereby the pressure inside the vessel is retained therein.

The valve 1 is of the general character of that disclosed and claimed in a copending application of John H. Hilldale, Serial No. 16,158, filed March 22, 1948, now Patent No. 2,667,891. It is fitted in a suitable opening 6 in the lid of the vessel and is composed of a valve body 7, a cap 8, and a lower plug 9. The valve body 7, which is inserted through the opening 6 from the inside, has a shoulder section 10, a threaded section 11, and an upper portion 12 which tightly fits into the cap 8. A small gasket 13, of material such as that of gasket 4, is located on the shoulder 10 to seal the opening 6. The cap 8 is provided with an internal threaded portion 11a to engage the threaded section 11 of the valve body. It can be seen that the threaded insertion of the valve body into the cap, with subsequent tightening of the cap on the body, will retain the valve body in the lid. A shoulder bottom 14 of the cap 8 lands snugly on the lid top to prevent loose rotation of the assembly in the opening 6. The top of the cap 8 has two parallel sides 15, milled or otherwise formed to provide suitable surfaces such as may be engaged by a small tool to tighten the cap on the valve body. A small opening 16 is drilled centrally in the top, the purpose of which will be presently described.

The valve body 7 is essentially hollow, having a variable stepped bore 17 along its axis. This bore, stepped so that it may be made by successive operations of a standard commercial screw machine lathe, has, starting at its lowest part, an internal threaded section 18, three parallel sided bores of decreasing diameter 19, 20, 21 and a bore 22 of substantially smaller diameter than the aforementioned three. This bore 22 is headed at 24 by a sealing shoulder from which a smaller diameter bore 23 continues. The uppermost bore 26 is of diameter equal to the opening 16 of the cap. A passage 25 is provided to connect the internal bore 23 with a milled slot 27 in the side of the valve body.

Assembled with the valve stem 28 is a piston plate 29, a dished cylinder bottom 30 and the lower plug 9. A snap ring 31 is located in a suitable groove 32 at the lower end of the valve stem 28 to retain the parts in assembly.

The valve stem 28 has an upper part 33 of diameter which shall freely slide in the opening 16 of the cap, a double conical shoulder portion 34 of such angle that it will afford a sealing seat against the shoulder 24 of the upper bore 22, and a lower part 35 of diameter smaller than the upper part. In the lower end of part 35 is cut the groove 32 for the snap ring 31. The piston plate 29 has axially located bosses 36, 37 on either side of the plate and is drilled to seat the shoulder 34 of the valve stem 28. The dished cylinder bottom 30 has a vertical side 38 of diameter to fit snugly into bore 19 and of height to extend from shoulder 39 to the undercut 40 at the top of the threaded section 18. It has an axially located orifice 41 on which the boss 37 of piston plate 29 will seat.

The lower plug 9 has two cut-out sides 42 on its threaded section and a transverse slot 43 milled or otherwise cut across its top, substantially normal to the side cutouts 42. From the bottom of the plug is drilled an opening 44 to accommodate the snap ring assembly of the valve stem. Continuing from the apex of the drilled opening, a continuing orifice 45 is drilled through to the slot 43.

The assembly of the valve stem, piston plate, cylinder bottom, and plug is retained as a unit by the snap ring 31 which will not pass through the orifice 45 of the plug.

The assembly of the valve stem, piston plate, cylinder bottom and plug is assembled with the valve body by the careful insertion of the end of the upper half of the valve stem in the openings 16, 26 and threadedly connecting the plug and valve body at 18. As previously mentioned, the dished cylinder bottom fits in the bore 19 and is held securely against the shoulder 39 by the plug 9. Assembly of the various elements together and to the lid of the pressure cooking vessel is easily accomplished inasmuch as the plug 9 has a knurled peripheral surface 46 and the cap 8 has the flat sides 15 for removing it from the valve body.

The valve device, mounted on the lid of a pressure cooker as shown in Fig. 6, is adapted for cooperative association with a control device 47 of the general character disclosed in the first-mentioned patent. Such control device, as shown in Fig. 6, comprises a base 48 in which there is mounted a heating element 49, and a vertical column 50 containing control mechanism including a spring-biased movable member 51. Mounted on member 51 is a hinged element 53 which is suspended freely from it. The present invention is not concerned with the control device 47, apart from the fact that the valve device of the present invention is adapted to cooperate with the member 51. It suffices to note here that the member 51 is actuated by the valve device to cause apparatus 47 to initiate a cooking operation, and said member actuates the valve to effect automatic venting of the pressure in vessel 3 at the end of the cooking operation, unless the vessel is removed from said apparatus for quench cooling as hereinafter described. During automatic venting the stem flows in the direction of the arrows in Fig. 6.

The operation of the valve may best be understood by reference to Figs. 1 to 4. In Fig. 1 the component parts of the valve are shown in the positions they assume when no pressure exists in the vessel 2. It should be noted that the piston plate 29 is in its lowest position, resting in the dished cylinder bottom 30. The valve stem 28 is also in its lowermost position, the shoulder 34 resting in sealing contact on the opening in the piston plate upper boss 36. It is in this position of the components that the cooking cycle begins. When the pressure cooking vessel is placed in cooperative association with the control actuating member 51 (Fig. 2), that member exerts a downward force on the valve stem. In the illustrated embodiment, that downward force is just above four ounces, but of course it may be modified in consideration of similar modifications in the weights of the moving components and in the sizes of the various openings and valve seats. As steam pressure rises in the vessel, that pressure is communicated to the piston by a path which is between the bottom of the valve body and the knurled portion of the plug, up past the cutaway section of the threaded upper portion of the plug and to the orifice in the dished cylinder bottom by way of the slot in the top of the plug.

It should be mentioned here that the relationship between the forces acting downward on the piston plate (i. e. the external force applied to the top of the valve stem by the control lever 51 and the gravitational forces downward due to the weight of the valve stem and piston plate) and the diameter of the orifice in the dished cylinder bottom is such that a certain pressure within the vessel (e. g. ten pounds per square inch gauge) will cause the piston plate to unseat from that orifice. As the pressure within the vessel rises to unseat the piston plate from the orifice in the dished cylinder bottom, the pressure is immediately allowed to impinge on the total diameter of the piston plate with a substantially increased total upward force which promptly accelerates the piston plate into the position of Fig. 2. Because of the weight of the valve stem and the downward force applied by lever 51, the shoulder 34 remains seated on the piston plate and the valve stem is carried upward by the upward movement of the plate. The upward movement of the valve stem moves the lever 51 upward and initiates a timed cooking cycle. The pressure above mentioned which initiates the cooking cycle is less than full cooking pressure (e. g. fifteen pounds per square inch gauge) by a predetermined amount.

Figure 2:
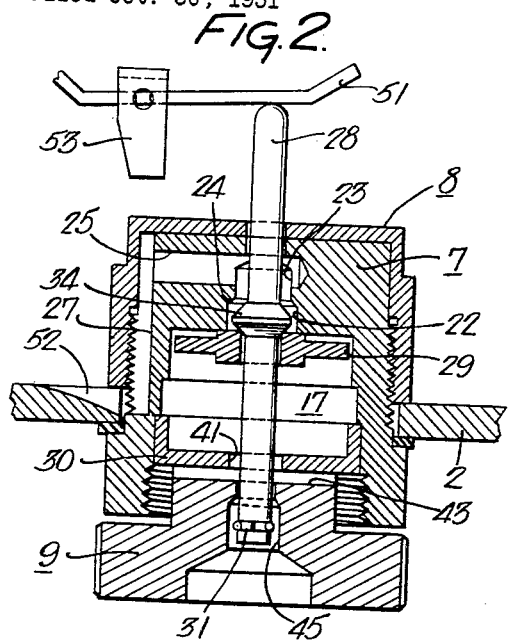
Fig. 2 is a sectional view showing the disposition of the elements when the vessel is in cooperative relation with associated parts of an automatic control device, and when the pressure in the vessel is in excess of the initial actuating pressure or equal to but not in excess of the full cooking pressure.
Figure 3:
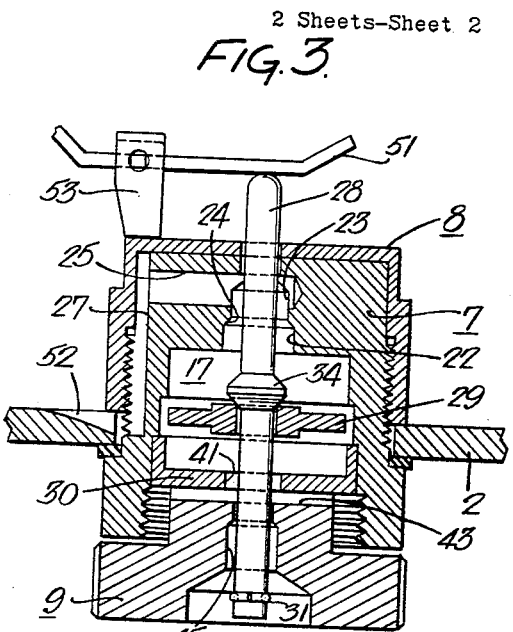
Fig. 3 is a sectional view showing the elements in the positions they are caused to assume during venting of the vessel.
Figure 4:
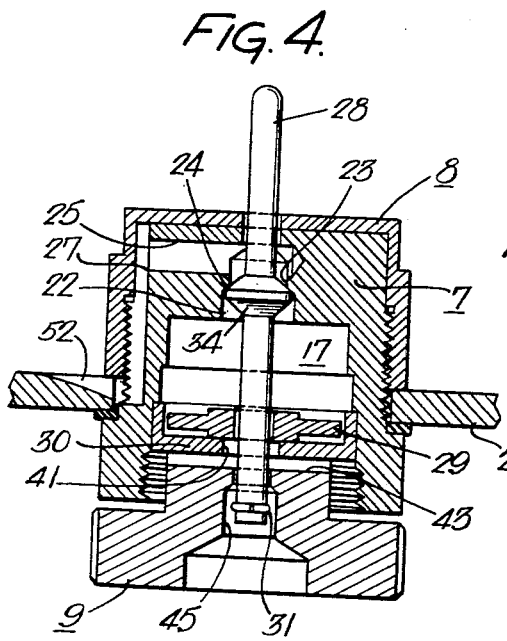
Fig. 4 is a sectional view showing the disposition of the elements when at least a small pressure exists in the vessel and when the cooker has been removed from cooperative relation with the associated control device.
Figure 5:
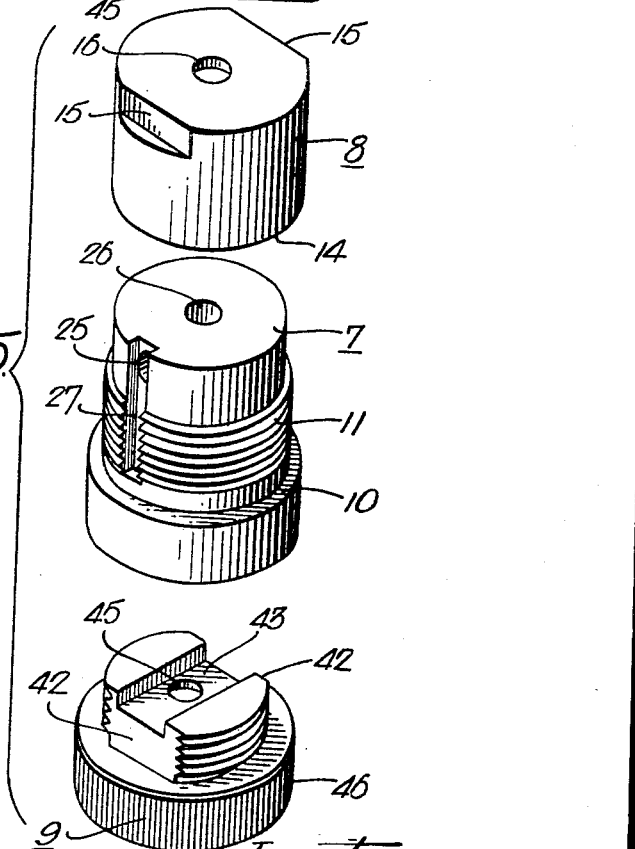
Fig. 5 is a perspective exploded view of certain parts of the valve device.

As may be seen from Fig. 2, when pressures in excess of the initial actuating pressure, but less than or equal to the full cooking pressure exist in the vessel, the movable valve elements are disposed in sealing relationship in the top of the valve body. Should the pressure exceed the desired full cooking pressure, the valve stem is moved upward from its seat on the upper boss of the piston plate. Here too, the combination of downward forces on the valve stem (i. e., the loading of the actuating lever and gravitational force due to the weight of the valve stem) and the diameter of the orifice in the piston plate are so related that pressures in the vessel in excess of the full cooking pressure will lift the valve stem from its sealing contact on the upper boss of the piston plate.

As the pressure lifts the shoulder 34 of the valve stem from its sealing contact on the piston plate, steam will flow through the orifice in that plate and around the shoulder of the valve stem into the passage 25. The passage 25 in the valve body top ends in the downwardly directed slot 27 which terminates in the groove 52 formed in the top of the pressure cooker lid. This path permits the steam which is vented from the interior of the vessel to escape to the atmosphere and thus reduce the pressure within the vessel. As the increased pressure is vented, the valve stem is held by the stream of rising steam in a position intermediate the positions of the valve stem shown in Figs. 2 and 4. The valve stem assumes this "floating" position upon the attainment of pressures somewhat in excess of the full cooking pressure, e. g. fifteen pounds per square inch gauge. Should there be a sudden, almost instantaneous surge in pressure of approximately six to eight pounds per square inch above the full cooking pressure, the valve stem will seal in the position shown in Fig. 4. However, that possibility is precluded if the applied heat is insufficient to produce such rise of pressure, as is the case in the automatic control of the first-mentioned application. Moreover, a stop may be provided in conjunction with lever 51 to prevent such seal.

According to the present invention, the valve further provides for improved venting of the steam at the end of an automatic timed cooking period. As described in the first-mentioned patent, at the termination of a timed cooking period, additional downward force is applied to the valve stem through the control lever 51. This increase in loading on the valve stem is predetermined to overcome the upward steam pressure induced force and to cause the piston plate 29 to be moved downward from the top of the valve body. As may be seen in Fig. 2, the stepped main bore 17 of the valve body has three sections of decreasing diameter. The lowest diameter is the largest, and when the dished cylinder bottom 30 is held therein the bore then is composed of lower and upper sections of equal diameters, with the central section of diameter larger than either of the end sections. The clearance between the piston plate periphery and the inside wall of the lowest section of the bore of the valve body is quite small. This small clearance is desirable because, as the piston plate is initially raised from the orifice in the dished cylinder bottom a minimum quantity of steam will leak around the plate. This small leakage will cause a maximum upward force as the valve stem and piston plate are initially accelerated upwards. This, therefore, insures prompt and rapid vertical movement of the plate and valve stem once the seal is broken. The vertical acceleration imparted to the valve stem and piston plate in its rise through the small clearance zone is adequate to insure sufficient velocity past the large clearance middle zone with almost no steam leakage. This is evidenced by the almost complete absence of visible steam from the vent passage during this operation.

At the end of a timed cooking period, the control lever 51 applies a downward force to effect venting as follows. The control lever 51, actuated as described in the first-mentioned Turner et al. patent, applies a downward force on the valve stem 28 to break the seal of the piston plate upper boss 36 against the top of the valve body. It should be noted that this downward force is predetermined in relation to the upward pressure to break the seal of the piston plate. This small downward movement permits the steam pressure to vent around the piston plate to the atmosphere at the optimum rate. The piston plate is held upwards against the shoulder 34 of the valve stem by the stream of escaping steam and the pressure difference between the upper and lower sides of the plate. The downward force exerted on the valve stem is so determined that it will break the seal at the top of the piston plate but the piston plate will be held tightly against the shoulder of the valve stem by the passing steam stream. As the pressure in the vessel slowly diminishes the downward force on the valve stem acts to further depress the piston plate towards the enlarged middle section of the valve bore. As the lever 51 depresses the valve stem towards the lowest position the hinged member 53 engages the top of the cap 8. The hinged member 53 prevents further downward movement of the lever 51 and thus holds the piston plate in the enlarged middle section where the clearance around the piston plate is a maximum and the venting is least impeded. This increased venting clearance permits almost all of the remaining pressure to be rapidly "dumped." This "dumping" is desirable because it provides an increased rate of venting as the pressure decreases and thus decreases the total venting time. When the piston plate can no longer be sustained in position in the enlarged middle section it drops to the bottom of the cylinder and the very small remaining pressure vents by holding the valve stem just above the upper boss of the plate.

It will be seen from the drawings and the foregoing description that the present invention provides a valve device comprising an outlet port 22 through which the pressure of the cooker may be vented, movable valve means cooperative with said port to retain the pressure of the cooker when the latter is operating in a predetermined pressure range, the movable valve means including an element adapted to be subjected to an external force so that the movable valve means is movable away from said port by discrete change of the external force, and a walled structure surrounding the movable valve means and contoured to provide in conjunction with the movable valve means, upon movement of the latter from said port, first a relatively small orifice which increases in size as the valve means moves, and subsequently, a larger orifice, thereby first to effect a relatively high resistance to venting of the pressure and subsequently to "dump" the pressure of the cooker.

Although the pressure cooker equipped with the valve above described is intended primarily for full automatic operation, it will be desirable at times to effect rapid cooling of the contents of the cooker by placing the cooker beneath a stream of cold water, as from a faucet. While the present invention is not concerned therewith, the valve illustrated and described embodies means for retaining the pressure within the cooker whenever it is removed from the associated control apparatus. This feature is disclosed and claimed in a copending application of R. V. Eeckhout, Serial No. 16,194 filed March 22, 1948, now Patent No. 2,686,531.

When the cooking vessel is removed from cooperative association with the heating means and control column shown in Fig. 6, the downward force on the valve stem which is exerted by the control lever 51 is removed. The removal of such downward force has a substantial effect on the balance of upward and downward forces and corresponds, in effect, to a pronounced increased internal pressure. Because of the reduced downward load, steam pressure in the vessel near to or substantially below the full cooking pressure will cause the valve stem to rise to the position shown in Fig. 4 wherein it engages the shoulder 24 in the top of the valve body. This engagement effects a seal and prevents the escape of steam pressure from the interior of the vessel. With the valve stem thus raised to the elevated sealing position, the cooker may be placed beneath a cooling stream of water and quickly quenched. The weight of the valve stem is so small, considered with the sealing diameter of the shoulder 24, that it will be retained there until the pressure in the vessel drops to a very small amount. A slight further cooling will reduce the internal pressure to atmospheric and permit the lid of the vessel to be safely removed.

It will be seen that the parts of the valve are all simple elements, although several include inside and outside portions each having several different diameters, as well as external and internal threaded portions. All of these parts are shaped so that they may be made on automatic machinery in simple operational sequences with no undercuts, etc. requiring special tools.

It will also be seen that the parts can be easily disassembled by the housewife and may be cleaned by simply holding the elements in a stream of water.

Although a particular embodiment of the invention has been illustrated and described, it will be understood that the invention is capable of other forms of physical expression and is not limited to the illustrated embodiment.

I claim:

1. A valve device for use with a pressure source of the character described; comprising an outlet port through which the pressure of said source may be vented; movable valve means cooperative with said port to retain the pressure of said source when the source is operating in a predetermined pressure range, said valve means including an element adapted to be subjected to an external force, the valve means being movable away from said port by discrete change of the external force acting thereon; and a walled structure surrounding said valve means and contoured to provide in conjunction with said valve means, upon movement of the latter from said port, first a relatively small orifice which increases in size as the valve means moves away from said port, and upon substantial decrease of the source pressure an orifice sufficiently large to "dump" or quickly dispel the pressure of the source.

2. A valve device for use with a pressure source of the character described; comprising an outlet port through which the pressure of said source may be vented; movable valve means cooperative with said port to retain the pressure of said source when the source is operating in a predetermined pressure range, said valve means including an element adapted to be subjected to an external force, the valve means being movable away from said port by discrete change of the external force acting thereon; and a walled structure surrounding said valve means and having different sharply defined wall portions cooperative successively and respectively with different portions of said valve means to provide, upon movement of the valve means from said port, first a relatively small orifice which increases in size as the valve means moves away from said port, and upon substantial decrease of the source pressure an orifice sufficiently large to "dump" or quickly dispel the pressure of the source.

3. A control valve mechanism for use with a pressure source of the character described; comprising means providing a pressure flow path from said source to the atmosphere, including two spaced ports serially arranged; valve means movable by pressure of said source from one port to the other and including an element extending externally of the device for subjection to an external force acting in opposition to the pressure of said source, said valve means being adapted to seal the second port to retain the pressure of said source when said pressure rises to a predetermined value, said valve means being movable away from said second port by discrete change of the external force to vent the pressure of said source; means cooperative with said valve means to provide, upon movement of the latter from said second port, first a relatively small orifice which increases in size as the valve means moves from said second port, and upon substantial decrease of the source pressure an orifice sufficiently large to "dump" or quickly dispel the pressure of said source; and means for limiting the movement of said valve means by the external force to prevent closure of said first port during venting of said source.

4. A valve device for use with a pressure source of the character described; comprising means providing a pressure flow path from said source to the atmosphere, including two spaced ports serially arranged; a first valve member movable by pressure of said source from one port to the other, said member being of a form to provide a sudden increase in area thereof exposed to the pressure of said source after slight movement of said member from said one port; a second movable valve member extending externally of the valve device for subjection to an external force; means on said second member for transmitting force to and from said first member, whereby said second member is moved rapidly by said first member, upon the aforementioned sudden increase of pressure-exposed area of the first member, until said first member reaches said second port, said second member being further movable by excess pressure of said source to vent the excess pressure, said first member being movable from said second port by said second member in response to increase of the external force to vent the pressure of said source; and means cooperative with said first member to provide, upon inital movement of the latter from said second port, a relatively small orifice whereby to effect first a relatively high resistance to the venting of said source, and subsequently, upon further movement of said first member in response to decrease in pressure of said source, to provide a larger orifice whereby to "dump" the pressure of said source.

5. A valve device for use with a pressure source of the character described, comprising a hollow casing forming a chamber having a first port in communication with said source and a second port in communication with the atmosphere, said ports both being substantially smaller than the diameter of said chamber, a first valve member in said chamber movable between said ports and adapted to sealingly engage said ports, said member having an aperture therein smaller than said first port, and a second movable valve member extending exteriorly of said casing for subjection to an external force, said second member being adapted to cover said aperture and being movable by and with said first member under the influence of pressure of said source, said members normally being in position cooperatively to seal said first port and being movable together to seal said second port when the pressure of said source rises to a predetermined value, said second member being further movable to uncover said aperture whenever the pressure of said source exceeds a predetermined higher value, said members being movable by increase of the external force to open said second port and vent the pressure of said source, said chamber having a section adjacent to said second port only slightly larger than the area of said first member and an enlarged section to which said first member is moved and which enables free venting of the pressure about said first member.

6. A valve device comprising a valve casing forming a chamber which communicates with a pressure source with which the device is associated, said casing having a passage leading from said chamber to an outlet, a valve stem freely carried by said casing and extending through said chamber and said passage to the exterior of the casing for subjection to external pressure, said valve stem having a shoulder portion, and a pressure-operable piston plate freely movable within said chamber, said piston plate having an aperture therein and surrounding said valve stem and being engageable with said shoulder portion to move said valve stem in the direction of said passage, said stem being further movable in the same direction by excess pressure to uncover said aperture and thus relieve the excess pressure, said piston plate being movable in the opposite direction by said valve stem to vent the pressure of said source, said chamber having a section adjacent to said passage only slightly larger than the area of said piston plate and an enlarged section to which said piston plate is moved and which enables free venting of the pressure about the edge of the piston plate.

7. A valve device comprising a valve casing forming a chamber which communicates with a pressure source with which the device is associated, said casing having a passage leading from said chamber to an outlet, a valve stem freely carried by said casing and extending through said chamber and said passage to the exterior of the casing for subjection to external pressure, said valve stem having a shoulder portion, and a pressure-operable piston plate freely movable within said chamber, said piston plate having an aperture therein and surrounding said valve stem and being engageable with said shoulder portion to move said valve stem in the direction of said passage, said stem being further movable in the same direction by excess pressure to uncover said aperture and thus relieve the excess pressure, said piston plate being movable in the opposite direction by said valve stem to vent the pressure of said source, said chamber having spaced sections only slightly larger in cross-sectional area than the area of said piston plate, said chamber also having an enlarged intermediate section to which said piston plate is moved and which enables free venting of the pressure about the edge of the piston plate.

8. A valve device mounted on a horizontal support, and comprising a valve body, means removably retaining said body within an opening in said support, said body being formed to define a chamber and having a passage leading upward from said chamber to an outlet, an apertured bottom member seated in the lower part of said body, a retaining plug threadedly engaging the bottom of said body and serving to hold said bottom member in place, said plug being formed to provide a passageway to the aperture in said bottom member, thus placing said chamber in communication with a pressure source with which the device is associated, a vertical valve stem supported by said body and said plug for vertical movement, said valve stem extending through said chamber and the passage thereabove to the upper exterior of said body for subjection to external pressure, said valve stem having a shoulder portion thereon, a piston plate freely disposed in said chamber for vertical movement therein and having an aperture through which said valve stem extends, the inner edge of said plate about the aperture thereof being engageable with the shoulder portion on said valve stem, said chamber having a section adjacent to said passage only slightly larger than the area of said piston plate and an enlarged section to which said piston plate is movable to effect rapid venting of the pressure of said source.

9. A valve device mounted on a horizontal support, and comprising a valve body, means removably retaining said body within an opening in said support, said body being formed to define a chamber and having a passage leading upward from said chamber to an outlet, an apertured bottom member seated in the lower part of said body, a retaining plug threadedly engaging the bottom of said body and serving to hold said bottom member in place, said plug being formed to provide a passageway to the aperture in said bottom member, thus placing said chamber in communication with a pressure source with which the device is associated, a vertical valve stem supported by said body and said plug for vertical movement, said valve stem extending through said chamber and the passage thereabove to the upper exterior of said body for subjection to external pressure, said valve stem having a shoulder portion thereon, and a piston plate freely disposed in said chamber for vertical movement therein and having an aperture through which said valve stem extends, the inner edge of said plate about the aperture thereof being engageable with the shoulder portion on said valve stem, said chamber having top and bottom sections only slightly larger in cross-sectional area than the area of said piston plate, said chamber also having an enlarged intermediate section to which said piston plate is movable to effect rapid venting of the pressure of said source.

10. A valve device for use on a pressure vessel to signal attainment of a predetermined pressure therein and to vent excess pressure and also to effect substantially full venting of the pressure, said device comprising a chamber having a pressure inlet port of substantially smaller area than the adjacent transverse area of said chamber and a pressure outlet port in communication with the atmosphere, said chamber also having an enlarged section, a plate in said chamber movable between said ports and engageable therewith, said plate being only slightly smaller in periphery than said chamber to provide small space between the periphery of said plate and the inner wall of the chamber, said plate having an aperture therein of smaller area than said inlet port whereby a relatively small area of the plate is exposed to pressure when the plate is engaged with said inlet port, and a movable element in said chamber normally closing said aperture and cooperative with said plate initially to close said inlet port, said element extending externally of said chamber for subjection to an external force, whereby increase of pressure to a value determined by said force first causes slight movement of said plate and said element with consequent exposure of the entire relatively large area of said plate to the pressure, whereupon said plate and said element are instantaneously moved to a position to seal said outlet port without appreciable loss of pressure about the periphery of the plate, said element being further actuated by excess pressure to uncover said aperture and thus vent the excess pressure through said outlet port, said plate being movable by said element from said outlet port upon increase of said external force to provide in cooperation with said chamber first a relatively small orifice which increases in size as said plate moves away from said outlet port, and upon substantial decrease of the pressure an orifice at said enlarged section sufficiently large to "dump" or quickly dispel the pressure.

11. A valve device for use on a pressure vessel to signal attainment of a predetermined pressure therein and to vent excess pressure and also to effect substantially full venting of the pressure, said device comprising a chamber having a pressure inlet port of substantially smaller area than the adjacent transverse area of said chamber and a pressure outlet port in communication with the atmosphere, said chamber also having an enlarged section, a plate in said chamber movable between said ports and engageable therewith, said plate being only slightly smaller in periphery than said chamber to provide small space between the periphery of said plate and the inner wall of the chamber, said plate having an aperture therein of smaller area than said inlet port whereby a relatively small area of the plate is exposed to pressure when the plate is engaged with said inlet port, and a movable element in said chamber extending through said aperture and through said inlet port and having a portion normally closing said aperture and cooperative with said plate initially to close said port, said element extending externally of said chamber for subjection to an external force, whereby increase of pressure to a value determined by said force first causes slight movement of said plate and said element with consequent exposure of the entire relatively large area of said plate to the pressure, whereupon said plate and said element are instantaneously moved to a position to seal said outlet port without appreciable loss of pressure about the periphery of the plate, said element being further actuated by excess pressure to uncover said aperture and thus vent the excess pressure through said outlet port, said plate being movable by said element from said outlet port upon increase of said external force to provide in cooperation with said chamber first a relatively small orifice which increases in size as said plate moves away from said outlet port, and upon substantial decrease of the pressure an orifice at said enlarged section sufficiently large to "dump" or quickly dispel the pressure.

12. A valve device for use on a pressure vessel to signal attainment of a predetermined pressure therein and to vent excess pressure and also to effect substantially full venting of the pressure, said device comprising a chamber having a pressure inlet port of substantially smaller area than the adjacent transverse area of said chamber and a pressure outlet port in communication with the atmosphere, said chamber also having an enlarged section, a plate in said chamber movable between said ports and engageable therewith, said plate being only slightly smaller in periphery than said chamber to provide small space between the periphery of said plate and the inner wall of the chamber, said plate having an aperture therein of smaller area than said inlet port whereby a relatively small area of the plate is exposed to pressure when the plate is engaged with said inlet port, and a movable stem in said chamber normally closing said aperture and cooperative with said plate initially to close said inlet port, said stem extending externally of said chamber for subjection to an external force, whereby increase of pressure to a value determined by said force first causes slight movement of said plate and said stem with consequent exposure of the entire relatively large area of said plate to the pressure, whereupon said plate and said stem are instantaneously moved to a position to seal said outlet port without appreciable loss of pressure about the periphery of the plate, said stem being further actuated by excess pressure to uncover said aperture and thus vent the excess pressure through said outlet port, said plate being movable by said stem from said outlet port upon increase of said external force to provide in cooperation with said chamber first a relatively small orifice which increases in size as said plate moves away from said outlet port, and upon substantial decrease of the pressure an orifice at said enlarged section sufficiently large to "dump" or quickly dispel the pressure.

13. A valve device for use on a pressure vessel to signal attainment of a predetermined pressure therein and to vent excess pressure and also to effect substantially full venting of the pressure, said device comprising a chamber having a pressure inlet port of substantially smaller area than the adjacent transverse area of said chamber and a pressure outlet port in communication with the atmosphere, said chamber also having an enlarged section, a plate in said chamber movable between said ports and engageable therewith, said plate being only slightly smaller in periphery than said chamber to provide small space between the periphery of said plate and the inner wall of the chamber, said plate having an aperture therein of smaller area than said inlet port whereby a relatively small area of the plate is exposed to pressure when the plate is engaged with said inlet port, and a movable stem in said chamber extending through said aperture and through said inlet port and having a portion normally closing said aperture and cooperative with said plate initially to close said inlet port, said stem extending externally of said chamber for subjection to an external force, whereby increase of pressure to a value determined by said force first causes slight movement of said plate and said stem with consequent exposure of the entire relatively large area of said plate to the pressure, whereupon said plate and said stem are instantaneously moved to a position to seal said outlet port without appreciable loss of pressure about the periphery of the plate, said stem being further actuated by excess pressure to uncover said aperture and thus vent the excess pressure through said outlet port, said plate being movable by said stem from said outlet port upon increase of said external force to provide in cooperation with said chamber first a relatively small orifice which increases in size as said plate moves away from said outlet port, and upon substantial decrease of the pressure an orifice at said enlarged section sufficiently large to "dump" or quickly dispel the pressure.

14. A valve device for use on a pressure vessel to signal attainment of a predetermined pressure therein and to vent excess pressure and also to effect substantially full venting of the pressure, said device comprising a chamber having a pressure inlet port of substantially smaller area than the adjacent transverse areas of said chamber and a pressure outlet port in communication with the atmosphere, said chamber being formed in part by a removable member in which said inlet port is provided, a plug removably securing said member in place, said chamber also having an enlarged section, a plate in said chamber movable between said ports and engageable therewith, said plate being only slightly smaller in periphery than said chamber to provide small space between the periphery of said plate and the inner wall of the chamber, said plate having an aperture therein of smaller area than said inlet whereby a relatively small area of the plate is exposed to pressure when the plate is engaged with said inlet port, and a movable stem in said chamber extending through said aperture and said inlet port and loosely connected to said plug, the latter permitting limited movement of the stem, said stem having a shoulder normally closing said aperture and cooperative with said plate initially to close said inlet port, said stem extending externally of said chamber for subjection to an external force, whereby increase of pressure to a value determined by said force first causes slight movement of said plate and said stem with consequent exposure of the entire relatively large area of said plate to the pressure, whereupon said plate and said stem are instantaneously moved to a position to seal said outlet port without appreciable loss of pressure about the periphery of the plate, said stem being further actuated by excess pressure to uncover said aperture and thus vent the excess pressure through said outlet port, said plate being movable by said stem from said outlet port upon increase of said external force to provide in cooperation with said chamber first a relatively small orifice which increases in size as said plate moves away from said outlet port, and upon substantial decrease of the pressure an orifice at said enlarged section sufficiently large to "dump" or quickly dispel the pressure.

References Cited in the file of this patent

UNITED STATES PATENTS

| | | |
|---|---|---|
| 1,148,193 | Ross | July 27, 1915 |
| 1,200,842 | Johnson | Oct. 10, 1916 |
| 2,001,487 | Doherty | May 14, 1935 |

FOREIGN PATENTS

| | | |
|---|---|---|
| 179,876 | Germany | 1906 |